United States Patent

[11] 3,628,344

| [72] | Inventor | Alfred T. King<br>615 York Ave., Lansdale, Pa. 19446 |
| --- | --- | --- |
| [21] | Appl. No. | 799,714 |
| [22] | Filed | Feb. 17, 1969 |
| [45] | Patented | Dec. 21, 1971 |

[54] APPARATUS AND METHOD FOR CONCENTRATION OF LIQUID BEARING SOLIDS BY FREEZING
7 Claims, 4 Drawing Figs.

[52] U.S. Cl. .................................................. 62/58,
  23/273 F, 99/199, 99/205, 99/71
[51] Int. Cl. .................................................. B01d 9/00
[50] Field of Search ............................................ 62/58;
  23/273 F

[56] References Cited
UNITED STATES PATENTS

| 2,602,745 | 7/1952 | Cunningham ............... | 62/58 |
| 2,632,314 | 3/1953 | Vance ........................ | 23/273 |
| 3,171,727 | 3/1965 | Brown, et al. ............... | 62/58 |
| 3,205,078 | 9/1965 | Lund .......................... | 62/58 |
| 3,347,058 | 10/1967 | Svanoe ....................... | 62/58 |
| 3,400,549 | 9/1968 | Karnofsky ................... | 62/58 |
| 3,435,625 | 4/1969 | Wiegandt .................... | 62/58 |

Primary Examiner—Norman Yudkoff
Assistant Examiner—R. T. Foster
Attorney—C. Hercus Just ABSTRACT: Apparatus and process concentrating the solids content of a solids-containing solution or suspension by forming seed crystals of the vehicle or solvent and, by accurately controlled refrigeration and circulation of such solution, promoting growth of said seed crystals into larger crystals, and separating the concentrated solute from such larger crystals by causing a column of said crystals to rise, while the circulation system is closed to the atmosphere, and draining the concentrated solute from said rising column of crystals while gently washing the crystals, if necessary, and removing the ice crystals and concentrated solute separately from the system. While useful in other fields, the invention is especially adapted to making beverage concentrates such as coffee, tea, fruit juices and the like.

PATENTED DEC 21 1971

3,628,344

INVENTOR
ALFRED T. KING

BY
ATTORNEY

APPARATUS AND METHOD FOR CONCENTRATION OF LIQUID BEARING SOLIDS BY FREEZING

BACKGROUND OF THE INVENTION

Soluble powdered coffee or "instant coffee" has been produced by extracting, with hot water, the soluble coffee solids from the previously roasted and ground coffee beans. The extract is then concentrated and dehydrated, producing a soluble powder. This product has been produced and marketed very successfully. The process of dehydration frequently utilized steam heated evaporators and spray dryers. However, the heat and vacuum used in the process removes the delicate flavors and aromas from the product and results in a powder that, when redissolved in hot water makes a beverage that can not be compared with fresh roasted and ground coffee.

SUMMARY OF THE INVENTION

It is the object of this invention to provide a means and method of freezing a portion of the solvent in a solution or suspension and separating the frozen solvent from the solution, resulting in a more concentrated solution.

It is a further object of this invention to protect and retain the heat-sensitive soluble solids of the solution and remove from it the frozen solvent (water) in the form of pure clear ice crystals.

It is a further object of this invention to provide a process wherein small seed crystals of ice are produced and fed to a chilling unit where a means of agitation prevents ice from forming on the walls of the container and an additional means of agitation maintains the ice solution in a state of continual recirculation so that crystal growth is encouraged and a minimum of seed crystals are formed. Such seed crystals, or ice snow, which are very small, entrain the liquid concentrate and make it nearly impossible to separate the concentrate from the crystals.

It is a further object of this invention to avoid exposing the extract to the air during the entire process, thereby eliminating the problem of foaming in the solution and avoiding oxidation which degrades the product.

It is a further object of this invention to maintain the entire system full of liquid and under hydrostatic pressure of the liquid at all times to avoid any inspiration of air into the product. The discharge of frozen crystals and concentrated solute occurs at an elevation above the other components of the system.

It is a further object of this invention to eliminate a discharge pump, thereby avoiding crystal breakage in the ice liquid discharge. Since the discharge is above the other components and the system is operated while filled with liquid, the speed of the infeed pump will determine the discharge rate.

It is a further object of this invention to use no centrifuge to separate the concentrated solute from the frozen crystals of the solvent, thereby avoiding aeration and oxidation of the liquid concentrate or solute. The ice-liquid discharged from the freezing unit is conducted through a pipe to the lower end of a column consisting of a hollow cylinder larger in diameter than its feed pipe. The ice-liquid solution uniformly enters the hollow cylinder and the natural tendency of ice to float is employed to push the ice column gently above a point in the hollow cylinder where the liquid concentrate solute drains away from the rising ice column, such as through screening or fine slots in the circumference of the hollow cylinder. The ice column rises above this point of draining away the liquid concentrate, due to the buoyancy of the ice. A gently controlled uniform spray of water is directed onto the top of the column of ice as it rises. A scraper continuously removes the top of the ice column as it rises to a predetermined level, by pushing the removed ice to one side where it falls into a chute; to be conveyed away and it may be used for cooling incoming product.

A more complete understanding of this invention will be gained by referring to the accompanying drawings and the following description.

DESCRIPTION OF THE PREFERRED EMBODIMENTS

Figure 2:
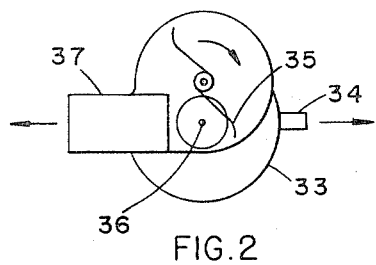
FIG. 2 is a plan view of the ice separation column showing an exemplary ice removing scraper.
Figure 3:
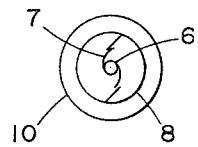
FIG. 3 is a typical section through the heat exchanger as seen on line 3—3 of FIG. 1.
Figure 4:
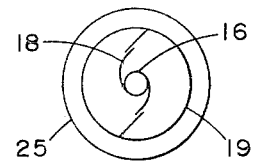
FIG. 4 is a typical section through the heat exchanger as seen on line 4—4 of FIG. 1.
Figure 1:
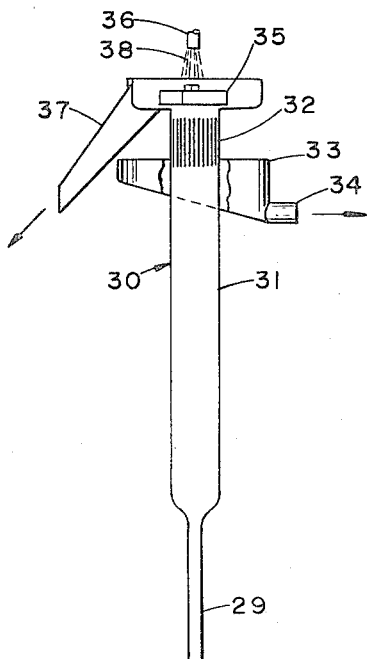
FIG. 1 is a diagrammatic view of the complete freeze concentrating mechanism embodying the principles of the invention.
Figure 1:
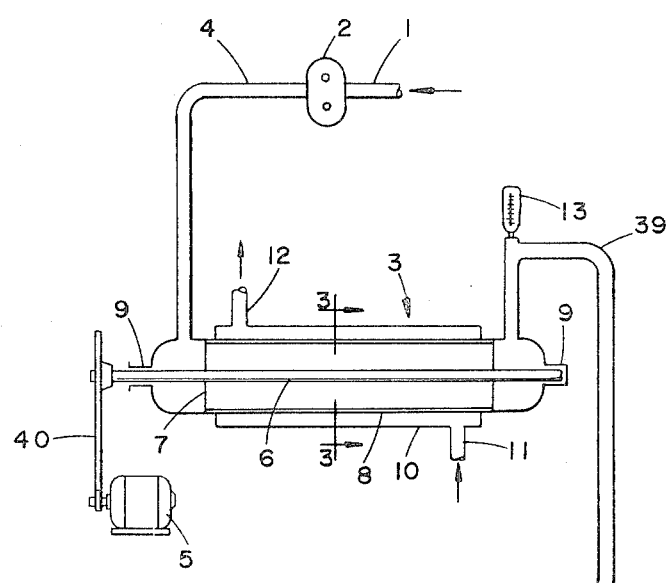
Figure 1:
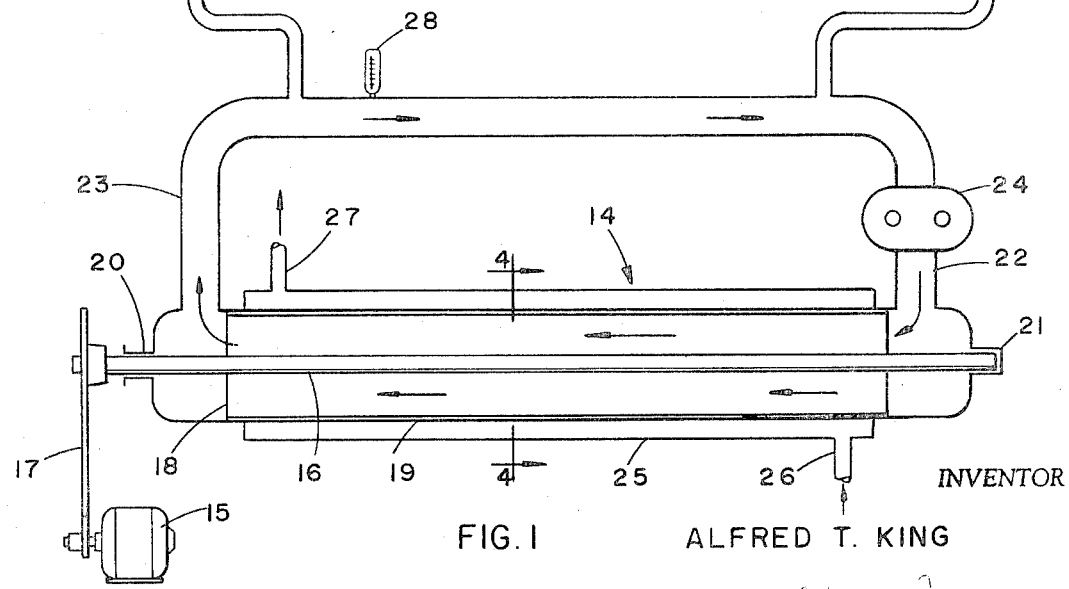

Referring to FIG. 1, pipe 1 is connected to a supply of chilled extract of solute dissolved in solvent. Pump 2 is rotated by a variable speed drive, not shown, which delivers the extract at a controlled uniform rate through inlet pipe 4 to a heat exchanger 3 in which seed crystals of the solute commence to form. Heat exchanger 3 consists of a driving motor 5 which rotates shaft 6 by means of a suitable gear or chain drive 40 to which are attached longitudinal scraper blades 7 which are spring loaded to lightly scrape the inside surface of tubular chamber 8. Tubular chamber 8 is closed at both ends and is provided with bearings 9 in which shaft 6 rotates. Tubular chamber 8 also has an outlet or discharge pipe 39.

A jacket 10 confines a refrigerant around chamber 8 as it enters through pipe 11, circulates around tubular chamber 8, and leaves through pipe 12. Outlet pipe 39 is provided with a thermometer 13 to indicate temperature of the extract. The extract flows through pipe 39 to heat exchanger 14 which is similar to, but larger than heat exchanger 3. Heat exchanger 14 is employed to rapidly promote the growth of seed crystals into larger crystals. Heat exchanger 14 consists of a drive motor 15 which drives rotatable shaft 16 by means of suitable gear of chain drive 17. Longitudinally extending scraper blades 18 are attached to shaft 16 and are suitably spring loaded to scrape the inside surface of tubular chamber 19. Tubular chamber 19 is closed at both ends and said ends are provided with bearings 20 and 21 in which shaft 16 rotates.

Tubular chamber 19 is provided with inlet pipe 22 and outlet pipe 23. A motor-driven pump 24 circulates the extract from pump 24, through pipe 22, then through heat exchanger 14, returning to pump 24 for the purpose of providing necessary continuous circulation of the solution but at a rate which does not promote foaming or aeration. A jacket 25 confines a refrigerant which enters through pipe 26, circulates around tubular member 19, and leaves through pipe 27. A thermometer 28 is provided in pipe 23 to indicate the temperature of the circulating extract. The system must be maintained under positive pressure at all times to exclude air therefrom.

Reasonable rapid circulation of the solution which contains the frozen crystals of solvent, such as water, is necessary to promote rapid growth of the crystals. The pump 24 provides such circulation but it also is desirable, as far as possible, to prevent the crushing of the crystals such as by engagement thereof by the impeller means of the pump. To minimize such breakage or crushing of the crystals, the principal items associated with the pump such as inlet pipe 22, heat exchanger 14 and outlet pipe 23, as well as pump 24 are of relatively large size and the pump is operated at a relatively slow speed such, for example, as between 150 and 200 r.p.m.

By way of illustration only and not restriction, the pipes 22 and 23 may be about 6 inches in diameter and the heat exchanger shell 19 may be about 8 inches in diameter. With such diameters, a 6 inch rotary positive displacement pump with single lobe impellers, when operated at the speeds indicated, will produce a velocity in the 6 inch pipes 22 and 23 between 135 and 180 ft. per minute. Preferably, the impeller and inner surfaces of the pump are of stainless steel, especially when beverages are being circulated. This is in contrast to conventional apparatus in which a much smaller size of pump is used, at much higher speeds. If a pump is placed in discharge pipe 29, it could leak air into the system, through packing glands, and cause undesirable foaming of the product, unless the system is placed under hydrostatic pressure.

Reference has been made hereinabove to seed crystals and larger crystals formed therefrom. To provide exemplary size ranges for a clearer understanding of the invention, the following is set forth for illustrative purposes only and not by way of limitation. Seed crystals of the type referred to are microscopic in size. Obtaining actual measurement is a difficult laboratory procedure. Even a so-called large crystal is very small as far as the present invention is concerned. Hence, such a large crystal may range in size from 0.015 to 0.030 inch. Crystals of this size provide very effective separation of the solute concentrate therefrom within the vertical tubular member 31.

An outlet pipe 29 conducts the extract (ice-liquid mixture) to the ice separation column 30 which is composed of vertical tubular member 31, larger in diameter than pipe 29, preferably about 20 times the cross-sectional area to reduce the velocity of the ice liquid mixture which rises by natural buoyancy in tubular member 31. Narrow or fine slots or screening 32 are provided in the upper section of tubular member 31 through which the concentrated liquid extract flows from tubular member 31 into catch pan 33 and out pipe 34 to suitable collective means, not shown. The ice content of the ice-liquid solution continues to rise gently above the liquid level being buoyed upward by the liquid.

As the ice emerges from the top of the vertical tubular member 31, a scraper 35 driven by a suitable motor, not shown, continually pushes the top layer off of the rising column of ice into chute 37 to be conveyed away to suitable means adapted to chill incoming product material. Also as this ice column rises, a fine spray of water 38 is directed onto the top of the rising ice column. The fine spray of water 38 which is preferably fan shaped and of a size just covering the top of the ice column, directed by a nozzle which, for example, is rotated slowly by another motor, not shown. The details of the tubular member 31 and the crystal separation from the solvent concentrate are the subject matter of a copending application filed on even date herewith.

The freeze concentration unit described above may be operated in stages, the liquid concentrate from the first stage feeding a second stage and repeating as many stages as necessary to arrive at the concentration desired. Ammonia provided by suitable equipment is highly suitable as a refrigerant for jackets 10 and 25 of heat exchange units 3 and 14.

To further clarify the process and operation of the system the following example is offered.

EXAMPLE

A 2.18 gallon per minute flow of coffee extract containing 22.5° soluble coffee solids was discharged from a continuous extractor and chilled with ice, from subsequent operation of the system, to 40° F. or below, and was introduced into the heat exchanger 3. The refrigeration to the heat exchanger 3 was controlled to cool the extract to 28° F., as indicated by thermometer 13, to form seed crystals. A range of between 3 and 5 percent below 32° F. may be used however. The extract flowing through pipe 39 to heat exchanger 14 contained fine seeds of ice. In heat exchanger 14 the extract was kept in rapid agitation to encourage crystal growth rather than formation of new seed crystals. The refrigerant to the heat exchange 14 was controlled to maintain a temperature in the rapidly agitated extract of approximately 21° as shown by thermometer 28. A range of between 10° and 15° below 32° F. may be used however.

Since the coffee extract circulated in a completely filled and closed system, ice-coffee extract flowed out of pipe 29 at a rate controlled by the inflow delivery of pump 2.

The ice crystals in the ice-coffee solution rose by flotation in the ice separation column 30, pure ice crystals were delivered to chute 37 and concentrated coffee extract flowed out of pipe 34 at a concentration of 31 to 32 percent soluble coffee solids.

For a higher concentration the extract may be introduced into a second stage similar to the above.

It should be pointed out that the coffee extract does not come into contact with air after it leaves the extractor or until ice separation takes place. The concentrated extract flows through screen 32 and into catch pan 33 by gravity and is not agitated or whipped to cause the extract to become aerated. However, a suitable cover, not shown, preferably is provided over the catch pan 33 to minimize contact of air with the extract. An inert gas blanket under such cover will also insure against air entrainment and subsequent oxidation.

What is claimed is:

1. A process for concentrating a solute within solution in a solvent therefor comprising the steps of passing said solution through a first heat exchanger at a relatively slow speed to initially chill the solution below the freezing temperature of the solvent and thereby form seed ice crystals of the solvent upon a surface of said heat exchanger, scraping said surface to remove said seed ice crystals therefrom as they are formed and agitate the same to disperse said seed crystals throughout said solution, passing said solution and crystals widely dispersed therein continuously to a second heat exchanger of substantially higher volume capacity than said first heat exchanger and continuously recirculating said solution and said crystals rapidly unidirectionally from the downstream end of the second heat exchanger to the upstream end of the second heat exchanger and agitating the same at a greatly increased of speed over the speed through said first heat exchanger and at a controlled refrigerating temperature substantially lower than that of said first mentioned heat exchanger to transfer the lower temperature thereof to the interface surfaces of said seed crystals while minimizing direct contact thereof with chilling surfaces of said second heat exchanger while the first said heat exchanger is out of the circulatory path of the second heat exchanger, thereby to cause additional solvent to freeze upon said seed crystals disposed and agitated within said solution to increase the size thereof, scraping the chilling surface of said second heat exchanger to prevent appreciable buildup of crystals thereon and facilitate agitation of said crystals in said solution, removing said larger ice crystals and concentrated solute from said second heat exchanger at a rate substantially equal to that at which the solution is introduced to said first heat exchanger and separating said frozen larger ice crystals of said solvent from said concentrated solution of solute.

2. The process according to claim 1 in which said solvent is water and said initial chilling temperature of said process in said first heat exchanger is within the range of between 3° and 5° below 32° F. and said subsequent refrigeration in said second heat exchanger is within the range of between 10° and 15° below 32° F.

3. The process according to claim 1 in which the solution and crystals discharged from said second heat exchanger rise upwardly through a constricted discharge conduit and then expand into a vertical conduit of substantially greater cross-sectional area than said discharge conduit to permit said frozen crystals to rise above the concentrated solution solely by buoyancy to effect draining of said concentrated solution therefrom as said column of solution and crystals rise.

4. The process according to claim 1 which the rate of initial delivery of the solution solely controls the rate of discharge of concentrated solute.

5. Apparatus to form a concentrated solution of a solute from a solution thereof in a solvent comprising in combination, a. means to feed such solution at a predetermined rate from a source thereof, b. an initial heat exchanger to receive said solution from said feed means and reduce the temperature thereof to a range of temperature below the freezing temperature of the solvent to form seed crystals of said solvent upon the walls of said exchanger and including scraper means operable to remove said crystals therefrom and intermix them with said solution, said initial heat exchanger having a discharge conduit of predetermined diameter, c. a secondary heat exchanger of substantially greater capacity than said initial heat exchanger and having an inlet connected to said discharge conduit of said initial heat exchanger to receive therefrom said solution containing seed crystals, and including means to maintain the temperature of said secondary heat exchanger substantially below that of said initial heat exchanger substantially below that of said initial heat exchanger to promote the growth of seed crystals into larger crystals of solvent, d. scraper means movable to agitate and extensively recirculate said solution and seed crystals within said secondary heat exchanger and means to operate said scraper means at reasonably rapid speed continuously to produce growth of larger crystals of solute at said lower temperature range while agitated within said solution, e. discharge means for said secondary heat exchanger operable to permit concentrated solute and said larger crystals formed therein to flow therethrough, f. a recirculating conduit of larger diameter than said discharge conduit of said initial heat exchanger connected directly between said inlet and discharge means of said secondary heat exchanger and operable to pass a mixture of solution and frozen crystals from said discharge means back to said inlet for further circulation therethrough to increase the size of the crystals in said solution before discharging the same from said secondary heat exchanger, g. a circulating pump within said recirculating conduit and operable to cause constant circulation and agitation of the solution and crystals unidirectionally through said heat exchanger to enhance the growth of larger crystals therein without aeration and foaming, h. a vertical column extending upward from said secondary heat exchanger and connected directly at the bottom thereof to said discharge means of said secondary heat exchanger and operable to permit a column of said crystals and solution to rise therein and permit said crystals to rise by buoyancy above the level of the solution is said column, i. means to drain said concentrated solute from said column of crystals, and j. means to remove the upper portion of said column of crystals therefrom.

6. The apparatus according to claim 5 in which said discharge conduit of said initial heat exchanger is connected to and discharges into said recirculating conduit adjacent the inlet of said secondary heat exchanger and said vertical column having an inlet conduit at the bottom thereof connected to and communicating with said recirculating conduit adjacent said discharge means of said secondary heat exchanger.

7. The apparatus according to claim 6 in which said inlet conduit of said vertical column is of a smaller diameter than said recirculating conduit.

* * * * *